United States Patent [19]

Hoenig et al.

[11] Patent Number: 4,786,149

[45] Date of Patent: Nov. 22, 1988

[54] ARRANGEMENT FOR OPTICAL IMAGE PROCESSING

[75] Inventors: Eckhardt Hoenig, Erlangen; Burkhard Lischke, Munich, both of Fed. Rep. of Germany

[73] Assignee: Siemens Aktiengesellschaft, Munich, Fed. Rep. of Germany

[21] Appl. No.: 52,548

[22] Filed: May 20, 1987

[30] Foreign Application Priority Data

May 22, 1986 [DE] Fed. Rep. of Germany ....... 3617167

[51] Int. Cl.$^4$ ...................... G02B 27/42; G02B 26/02; G02F 1/03; G02F 1/00
[52] U.S. Cl. .................... 350/356; 350/359; 350/360; 350/162.12; 350/266; 350/272
[58] Field of Search .................. 350/162.12, 266, 272, 350/359, 360, 356; 332/7.51

[56] References Cited

U.S. PATENT DOCUMENTS

| | | | |
|---|---|---|---|
| 3,886,310 | 5/1975 | Guldberg et al. | 350/360 |
| 3,905,019 | 9/1975 | Aoki et al. | 350/162.12 |
| 3,977,771 | 8/1976 | Horner | 350/162.12 |
| 4,182,623 | 1/1980 | Haines | 350/162.12 |
| 4,235,522 | 11/1980 | Simpson et al. | 350/266 |
| 4,351,589 | 9/1982 | Chavel et al. | 350/342 |
| 4,698,602 | 10/1987 | Armitage | 350/360 |

OTHER PUBLICATIONS

Zweig, "Two-Dimensional Laser Deflection Using Fourier Optics" Short Communication, IBM Journal, vol. 9, No. 4, 7-1965.
Stark et al., "Linear Spatial Filtering with Crossed Ultrasonic Light Modulators" Proceeding of the IEEE, vol. 57, No. 8, Aug. 1969.

Primary Examiner—Eugene R. LaRoche
Assistant Examiner—Michael Shingleton
Attorney, Agent, or Firm—Kenyon & Kenyon

[57] ABSTRACT

For electro-optical image conversion as well as for optical image processing by spatial filtering, a two-dimensional optical filter is provided which comprises a microstructured grid, the openings of which are designed as a matrix of windows, the windows being provided with electrostatically movable thin-film closures. The window openings are controlled by electrostatic charges which are provided by an electron beam. This matrix of light valves can preferably be used as a electro-optical converter as well as a Fourier filter in an optical computer.

4 Claims, 2 Drawing Sheets

ARRANGEMENT FOR OPTICAL IMAGE PROCESSING

BACKGROUND OF THE INVENTION

The present invention relates to an arrangement for optical image processing by spatial filtering.

As is well known, optical computers can perform, for instance, Fourier transformations at the speed of light by parallel information processing. In one known embodiment of optical iamge processing, a multilayer structure with a liquid crystal is provided as an absorption filter with two-dimensionally controlled absorption. Since in this filter, the location dependent absorption must be written in optically, the processing of image information which is present electronically, requires an additional transformation. In addition, image processing with coherent light is not possible in this embodiment since phase errors are not precluded in this multilayer structure (See U.S. Pat. No. 4,351,589).

SUMMARY OF THE INVENTION

It is an object of the present invention to provide an electronically controlled filter which can convert, on the one hand, as an input converter in an optical computer, electronic image information into optical image information and on the other hand, can be used as a filter, for instance, as a Fourier filter, in a system for optical image processing with the possibility to vary for a given image at a fast rate, different filter functions in a searching process in order to detect, amplify or correct, for instance, structures in the image. For instance, a spatial frequency which is associated with line information, is to be filtered out.

The above and other objects of the invention are achieved by an arrangement for optical image processing by spatial filtering, particularly for converting electronic image information into optical image information as well as for Fourier transformation, comprising a two-dimensional optical filter which comprises a microstructured grid, the windows of the grid being provided with electrostatically movable thin-film terminations, and by an electron beam for controlling the window openings.

A two-dimensional optical light valve array thus is obtained which can be addressed by the electron beam and can be controlled in analog fashion. It is preferably suited as a transformer of electronic image information into optical image information as well as a Fourier filter and, by a combination of the two functions, as an optical computer.

The filter provided by the invention comprises a carrier which is provided with a microstructured matrix of window openings, the thin-film terminations (or closures) of which consist of metal films which are connected to the edge of the window openings in an electrically insulating manner and are arranged self-supporting over the window openings. These thin-film terminations can be shifted by electrostatic charging in the direction of the film normal. The electrostatic charge is supplied by the electron beam, by which the size of the window openings can thus be controlled. It is achieved by selecting the energy of the electons that the corresponding thin-film termination is either charged up or discharged. The continuous analog degree of charging is determined by the energy and the intensity of the electrons.

BRIEF DESCRIPTION OF THE DRAWINGS

The invention will be explained in greater detail in the following detailed description, with reference to the drawings, in which.

DETAILED DESCRIPTION

Figure 1:
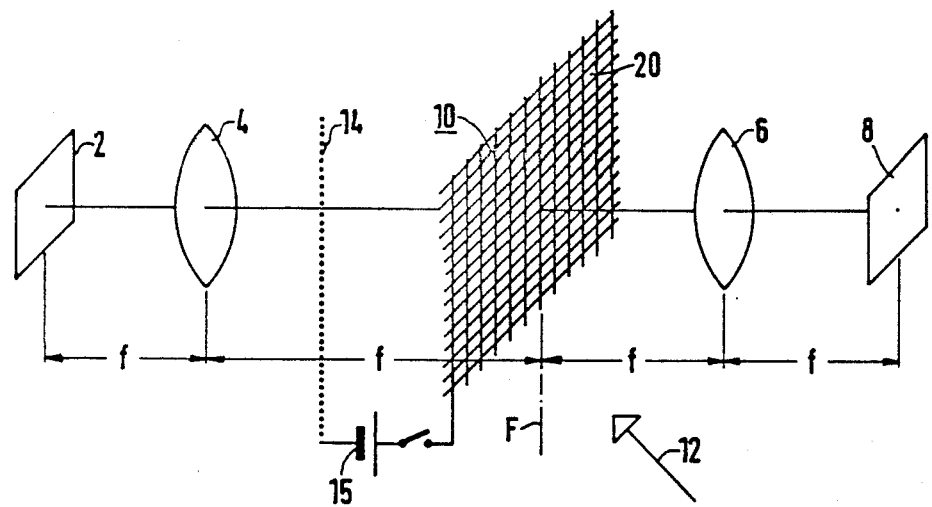
FIG. 1 shows schematically the application of an electronically controlled two-dimensional optical filter according to the invention as a Fourier filter for an optical computer.

With reference to the drawings, the embodiment of an arrangement for optical image processing by spatial filtering according to FIG. 1 contains an optical object structure 2 which is to be filtered with regard to spatial frequencies, for instance, the image plane of a coherent optical imaging system or a coherently illuminated photographic plate with image information; furthermore, two lenses 4 and 6 having focal length f, a light valve array 10 as well as a detector array 8 for the filtered structure, always in a Fourier arrangement. In this arrangement for optical image processing, the Fourier transform of the object structure 2 appears instantly in the Fourier plane F. The control information is transmitted by an electron beam 12 to the filter 10. In dependence on the location, the electron beam 12 controls the transparency of the filter 10. The structure filtered with regard to selected spatial frequencies appears in the detector plane instantaneously, i.e., at the speed of light.

As the electrostatic reference electrode for the matrix of window openings can serve an auxiliary grid 14 which is mounted in the immediate vicinity, which does not intereferre with the optical array path and is associated with a voltage source 15.

The filter 10 which can be applied preferably as a Fourier filter with analog random access in the Fourier plane F contains as the microstructured grid with electrostatically moved metallic thin-film termination (closures), a carrier with a matrix of windows 20 which are separated from each other by ribs.

Figure 2:
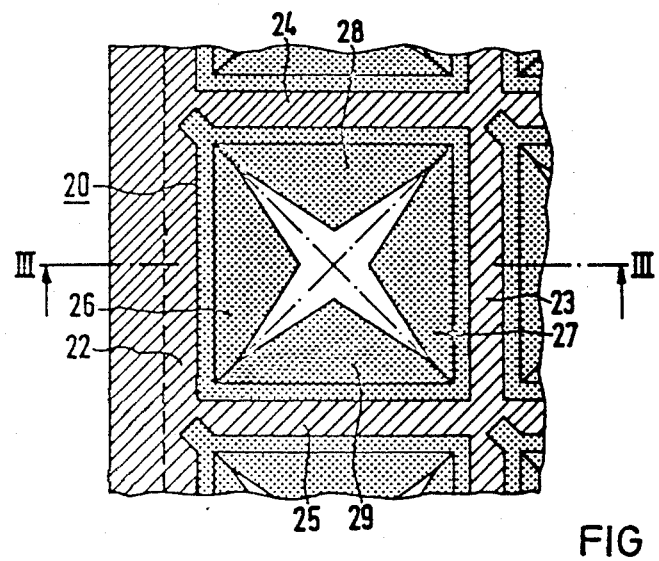
FIG. 2 shows the design of the microstructured grid with electrostatically moved thin-film terminations.

The metallic thin-film termination (closures) of the windows 20 consist, according to FIG. 2, of metal films 26 to 29 which can consist preferably of gold or also of titanium and are connected to the ribs 22 to 25 in an electrically insulating manner and are each arranged in a self-supporting manner above the opening of the windows 20. An electrically controlled electron beam 12 controls the electrostatic charging of these metal films 26 to 29 and thereby, the opening of the windows 20 from their closed position which is indicated in the figure by dash-dotted lines.

Figure 3:
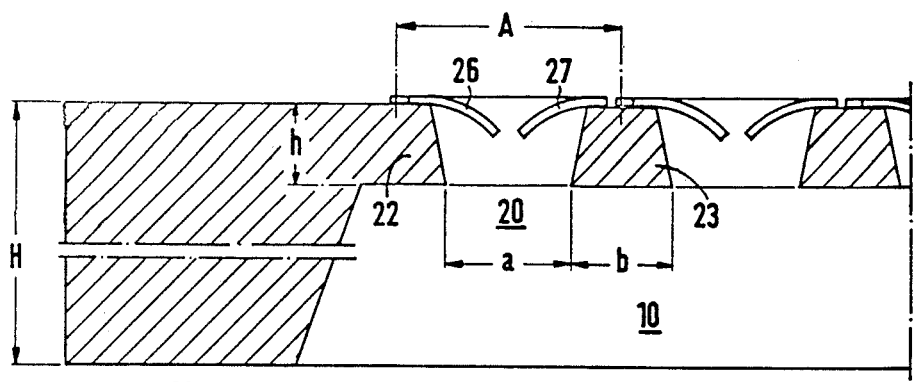
FIG. 3 shows a section through part of the grid according to FIG. 2.

In a cross section through part of the filter 10 with one of the windows 20 according to FIG. 3, the metal films 26 and 27 are indicated above the window 20 in a slightly open position. With a mean spacing A of the ribs 22 and 23 of, for instance, about 10 $\mu$m and an internal spacing a of the ribs 22 and 23 of, for instance, about 5 $\mu$m as well as a width of b of the ribs 23 of, for instance, about 4 $\mu$m as well as a height h of the ribs 22 and 23 of, for instance, about 3 $\mu$m, a grid 10 with, for instance, about $10^6$ openings/cm$^2$ can be realized.

The external edge region of the carrier 21 which may preferably comprise silicon or also boron nitride, is substantially reinforced for stability reasons; its height H can preferably be several 100 μm, and especial The electrostatic charge of the metal films 26 and 27 determines their deflection and thereby, the size of the window openings. The force for opening the windows 20 is obtained by the countercharge from the auxiliary grid 14. A restoring force of the metal films 26 and 27 for closing the windows 20 results from the spring action of the metal films as well as from a charge with reversed sign.

So that a sufficient deflection of the metal films 26 and 27 for a given charge is possible, the thickness of the metal films must, on the one hand, not substantially exceed a predetermined value of, say, 0.1 μm. Their thickness must, on the other hand, be large enough so that a sufficient restoring force for closing the windows 20 is generated; their thickness should therefore be at least 0.01 μm. Sufficient mobility of the metal films 26 and 27 is obtained with a thickness of preferably about 0.1 μm. In order to prevent the charges from leaking off, the metal films 26 and 27 are electrically insulated from the ribs 22 and 23. As electrical insulation can, for instance, serve a surface layer of the ribs 22 and 23, not shown in the figure. In conjunction with a carrier 21 of silicon, the surface region of the ribs 22 and 23 facing the metal films 26 and 27 can, for instance, be provided with a coating of silicon oxide or silicon dioxide.

For the preparation of the carrier 21, a method can be used, for instance, which is known substantially for the preparation of X-ray masks. The carrier can be prepared, for instance, of a plate with the thickness of the height H by removing the material on the underside down to the reinforced edge region by thin-etching. A doped surface layer with the height h can serve as the etching stop by suitable doping. From this thin layer, the openings of the windows 20 are then worked out likewise by etching.

The metal films 26 to 29 can be applied, for instance, first as a common metal layer to the carrier 21 before the openings of the windows 20 have been worked out of the carrier. Subsequently the openings of the windows 20 are then worked out from the thin-edged layer so that the ribs 22, 23 are generated and then, the metal films of the adjacent windows on the ribs 22 and 23 are cut open and subsequently or optionally simultaneously, the metal films, each belonging to one of the windows 20, are cut open by dry etching.

By amorphizing the metal films, a justifiable service life of the diaphragm can be achieved.

Figure 4:
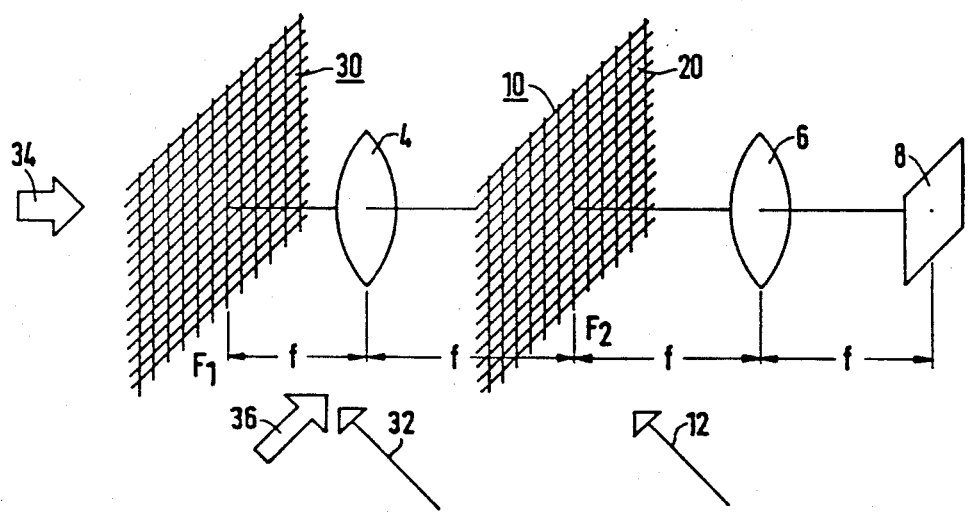
FIG. 4, shows schematically a controlled Fourier hologram for an optical computer with a preceding optical filter according to the invention.

In the embodiment of an arrangement according to FIG. 4, the filter 10 forming a light valve array is realized for converting two-dimensional information present in electronic form into a two-dimensional optical structure as well as its filtering with respect to spatial frequencies, connected to an electronic detector array 8 and an electronic computer for fed-back registration and control, an electronically controlled optical parallel computer is realized.

The embodiment according to FIG. 4 differs from the embodiment according to FIG. 1 only by the fact that in FIG. 4 the optical structure to be filtered is generated in FIG. 4 by a coherently illuminated light valve array 30. By the arrangement of this additional light valve array 30, a completely electronically controlled Fourier filter with two-dimensional amplitude modulation without any phase modulation is realized. In this embodiment, the original structure to be displayed as well as the filter structure can be varied electronically. An electronic image is again generated as the result. It is a special advantage that this optical computer need not link, like a digital computer, the algorithm for each picture element with the adjacent picture element and the Fourier transformation need not be calculated piecemeal from the total network of the matrix.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. An arrangement for optical image processing by spatial filtering, particularly for converting electronic image information into optical image information and for Fourier transformation, comprising a two-dimensional optical filter comprising a microstructured grid having windows, the windows being provided with electrostatically movable thin-film terminations, and further comprising electron beam means for controlling the position of the thin-film terminations thereby opening and closing the windows.

2. The arrangement recited in claim 1, wherein the grid comprises a carrier provided with a microstructured matrix of window openings having thin-film closures, said thin film closures comprising metal film means which are connected to ribs of the windows in an electrically insulating manner and being arranged self-supportingly above the opening of the windows and being movable by electrostatic charging in the direction of a normal to the film.

3. The arrangement recited in claim 2, wherein the films comprise amorphous metal films.

4. The arrangement recited in claim 1, wherein the filter is associated with an electrostatic auxiliary grid for controlling the total opening of the windows.

* * * * *